(12) United States Patent
Yanagisawa et al.

(10) Patent No.: US 6,918,251 B2
(45) Date of Patent: Jul. 19, 2005

(54) TURBO-CHARGED ENGINE WITH EGR

(75) Inventors: Naoki Yanagisawa, Fujisawa (JP); Takeshi Tokumaru, Fujisawa (JP); Hirokazu Kurihara, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 10/813,413

(22) Filed: Mar. 30, 2004

(65) Prior Publication Data

US 2004/0194463 A1 Oct. 7, 2004

(30) Foreign Application Priority Data

Apr. 3, 2003 (JP) ......................... 2003-100521

(51) Int. Cl.$^7$ .......................... F02B 33/44; F02M 25/07
(52) U.S. Cl. ................... 60/605.2; 60/612; 123/568.11; 123/568.12
(58) Field of Search ............... 60/605.2, 612; 123/568.11, 568.12; F02M 25/07

(56) References Cited

U.S. PATENT DOCUMENTS

| | | | | |
|---|---|---|---|---|
| 4,143,635 A | * | 3/1979 | Iizuka et al. | 123/568.11 |
| 4,669,442 A | | 6/1987 | Nakamura et al. | 123/571 |
| 5,142,866 A | * | 9/1992 | Yanagihara et al. | 60/605.2 |
| 5,517,976 A | * | 5/1996 | Bachle et al. | 60/605.2 |
| 5,562,086 A | * | 10/1996 | Asada et al. | 123/568.21 |
| 5,611,203 A | * | 3/1997 | Henderson et al. | 60/605.2 |
| 5,671,600 A | * | 9/1997 | Pischinger et al. | 60/605.2 |
| 6,009,709 A | | 1/2000 | Bailey | 60/605.2 |
| 6,062,027 A | * | 5/2000 | Landfahrer et al. | 60/605.2 |
| 6,202,414 B1 | * | 3/2001 | Schmidt et al. | 60/612 |
| 6,484,500 B1 | | 11/2002 | Coleman et al. | 60/612 |
| 6,715,289 B2 | * | 4/2004 | Mader et al. | 60/612 |
| 2002/0174654 A1 | | 11/2002 | Yang | 60/602 |

FOREIGN PATENT DOCUMENTS

| | | | | |
|---|---|---|---|---|
| DE | 101 54 151 A1 | 11/2001 | | |
| EP | 1 213 467 A2 | 6/2002 | | |
| JP | 09-137754 | 5/1997 | | |
| JP | 2000064912 A | * | 3/2000 | F02M/25/07 |
| JP | 2000-249004 | 9/2000 | | |
| JP | 2001-140653 | 5/2001 | | |
| JP | 2002-276382 | 9/2002 | | |
| JP | 2004100508 A | * | 4/2004 | F02M/25/07 |
| JP | 2004124749 A | * | 4/2004 | F02M/25/07 |

OTHER PUBLICATIONS

Copy of European Search Report for Serial No. EP 04 00 8072.

* cited by examiner

Primary Examiner—Thai-Ba Trieu
(74) Attorney, Agent, or Firm—McCormick, Paulding & Huber LLP

(57) ABSTRACT

This invention concerns a turbo-charged engine with EGR comprising an EGR passage connecting an exhaust passage upstream of a turbine of a turbocharger and an intake passage downstream of a compressor to each other for returning some of exhaust gas in the exhaust passage to the intake passage, and an EGR valve provided in the EGR passage for adjusting a passage area of the EGR passage. Capacity of the turbine is set such that in a high speed and high load region of the engine operating state, if the exhaust gas is supplied to the turbine with the EGR valve closed, the turbocharger overruns beyond a maximum speed limit, and if the EGR valve is opened to return some of the exhaust gas to the intake passage, the turbocharger rotates at less speed than the maximum speed limit. EGR can be performed in the high speed and high load region of the engine operating state without reducing power output and worsening fuel consumption.

15 Claims, 3 Drawing Sheets

TURBO-CHARGED ENGINE WITH EGR

CROSS-REFERENCE TO RELATED APPLICATION

Applicant hereby claims foreign priority benefits under U.S.C. §119 of Japanese Patent Application No. 2003-100521, filed on Apr. 3, 2003, and the content of which is herein incorporated by reference.

BACKGROUND OF THE INVENTION

1. Field of the Invention

The present invention relates to a turbo-charged engine with EGR (Exhaust Gas Recirculation).

2. Description of the Related Art

A type shown in FIG. 3 is known as a turbo-charged engine with EGR (see Japanese Patent Applications published with Nos. 9-137754 and 2000-249004, for example).

As illustrated, a turbine c is arranged in an exhaust passage b of a diesel engine a, and a compressor e driven by the turbine c is arranged in an intake passage d. An EGR passage f is connected to the exhaust passage b upstream of the turbine c and the intake passage d downstream of the compressor e, so that some of the exhaust gas in the exhaust passage b flows back to the intake passage d through the EGR passage f.

An EGR valve g, an EGR cooler h and a check valve i are provided in the EGR passage f. The EGR valve g adjusts a passage area of the EGR passage f. The EGR cooler cools the exhaust gas (EGR gas) flowing in the EGR passage f. The check valve i allows a flow only in a direction from the exhaust passage b side to the intake passage d side, and prevents the flow in the opposite direction thereof. A charge cooler j for cooling intake air is provided in the intake passage d downstream of the compressor e.

According to such turbo-charged engine with EGR, EGR is performed by opening the EGR valve g to allow some of exhaust gas in the exhaust passage b to flow toward the intake passage d through the EGR passage f. Reverse flow in the EGR passage f (or intake air flow from the intake passage d to the exhaust passage b) is prevented by the check valve i.

Conventionally, it is common that EGR is performed only in a low load region and is not performed in a high load region with the EGR valve g closed. The reason for this is described below. In the low load region, even if the EGR gas is inhaled by the engine, smoke and fuel consumption are not worsened and power output does not become lower, and the NOx reduction effect as an inherent effect of EGR can be acquired, because an amount of air inhaled by the engine is sufficient to an amount of injection fuel. However, in the higher load region, if the EGR gas is inhaled, the fuel consumption is worsened and the power output becomes lower and the smoke tends to be generated, because margin of the amount of intake air relative to the amount of the injection fuel becomes less in the higher load region and an amount of air (oxygen) becomes relatively insufficient.

On the other hand, there is a requirement in recent years that the fuel consumption and the exhaust gas should be improved, therefore, high pressure supercharging is made forward especially in the diesel engine a. By raising supercharging pressure, an amount of intake air per cylinder can increase, power output can increase, and fuel consumption (fuel consumption per unit horsepower) can improve. However, recklessly raising the supercharging pressure makes operation of EGR difficult, caused by relation between exhaust gas pressure and intake air pressure. And also, performing EGR means not supplying energy of exhaust gas to the turbine c of the turbocharger k, which leads into difficulty of matching the turbocharger k with the engine a.

Thus, in recent years that the engine is highly supercharged, an optimal solution about matching between a setting of the turbocharger k and an EGR control is not clarified.

It is an object of the present invention to provide a turbo-charged engine with EGR which attains optimization about matching between a setting of the turbocharger and an EGR control with regard to highly supercharged engine.

SUMMARY OF THE INVENTION

According to one aspect of the present invention, there is provided a turbo-charged engine with EGR comprising a turbocharger having a turbine and a compressor, an EGR passage connecting an exhaust passage upstream of the turbine of the turbocharger and an intake passage downstream of the compressor to each other for returning some of exhaust gas in the exhaust passage to the intake passage, and an EGR valve provided in the EGR passage for adjusting a passage area of the EGR passage, wherein capacity of the turbine is set such that in a high speed and high load region of the engine operating state, if the exhaust gas is supplied to the turbine with the EGR valve closed, the turbocharger overruns beyond a maximum speed limit, and if the EGR valve is opened to return the some of the exhaust gas to an intake passage side, the turbocharger rotates at lower speed than the maximum speed limit.

Preferably, the turbo-charged engine with EGR further comprises a control device for opening the EGR valve in a region that the turbocharger overruns beyond the maximum speed limit.

Optionally, the turbocharger has a high stage turbine and a low stage turbine provided in series in the exhaust passage of the engine, and a high stage compressor and a low stage compressor provided in series in the intake passage of the engine and respectively driven by each of the turbines, and the EGR passage connects the exhaust passage upstream of the high stage turbine and the intake passage downstream of the high stage compressor to each other.

Preferably, capacities of the high stage turbine and the low stage turbine are respectively set such that in the high speed and high load region of the engine operating state, if the exhaust gas is supplied to the high stage turbine with the EGR passage closed, at least one of the high stage turbine and the low stage turbine overruns beyond the maximum speed limit, and if the EGR passage is opened to return some of the exhaust gas to the intake side, both of the turbines rotate at lower speed than the maximum speed limit.

Preferably, the turbo-charged engine with EGR further comprises a charge cooler for cooling intake air, which is provided in the intake passage and located at downstream side of a position to which the EGR passage is connected.

Preferably, an EGR cooler for cooling EGR gas is provided in the EGR passage.

Preferably, the EGR cooler is provided in the EGR passage downstream side of the EGR valve.

Preferably, a check valve is provided in the EGR passage to allow a flow only in a direction from the exhaust passage to the intake passage and to prevent the flow in an opposite direction thereof.

Preferably, the check valve is provided in the EGR passage downstream side of the EGR valve.

Optionally, the engine is a multi-cylinder engine and has an exhaust manifold and an intake manifold at least one of which is divided into two or more, wherein each parts of the divided exhaust manifold or intake manifold are individually connected to the divided or not divided intake manifold or exhaust manifold by two or more of the EGR passages such that when one cylinder involved in the exhaust manifold to which a certain EGR passage is connected is in exhaust stroke, another cylinder involved in the intake manifold to which the certain EGR passage is connected is in intake stroke.

Optionally, the engine is a multi-cylinder engine and has an exhaust manifold divided into two or more, wherein each parts of the divided exhaust manifold are individually connected to the intake passage by two or more of the EGR passages.

Optionally, the engine is a six-cylinder engine and has an exhaust manifold, combustion order of each cylinders is No. 1, No. 5, No. 3, No. 6, No. 2 and No. 4, the exhaust manifold is divided into a first exhaust manifold gathering No. 1–3 cylinders and a second exhaust manifold gathering No. 4–6 cylinders, and the EGR passage comprises a first EGR passage connecting the first exhaust manifold and the intake passage to each other and a second EGR passage connecting the second exhaust manifold and the intake passage to each other.

Optionally, the first EGR passage and the second EGR are gathered to connect to the intake passage.

Preferably, the EGR valve, the EGR cooler and the check valve are provided in series in each of the first EGR passage and the second EGR passage.

These and other objective of the present invention, and their preferred embodiments, shall become clear by consideration of the specification, claims and drawings taken as a whole.

DESCRIPTION OF THE PREFERRED EMBODIMENTS

A preferred embodiment of this invention will be described hereinbelow with reference to the accompanied drawings.

Figure 1:
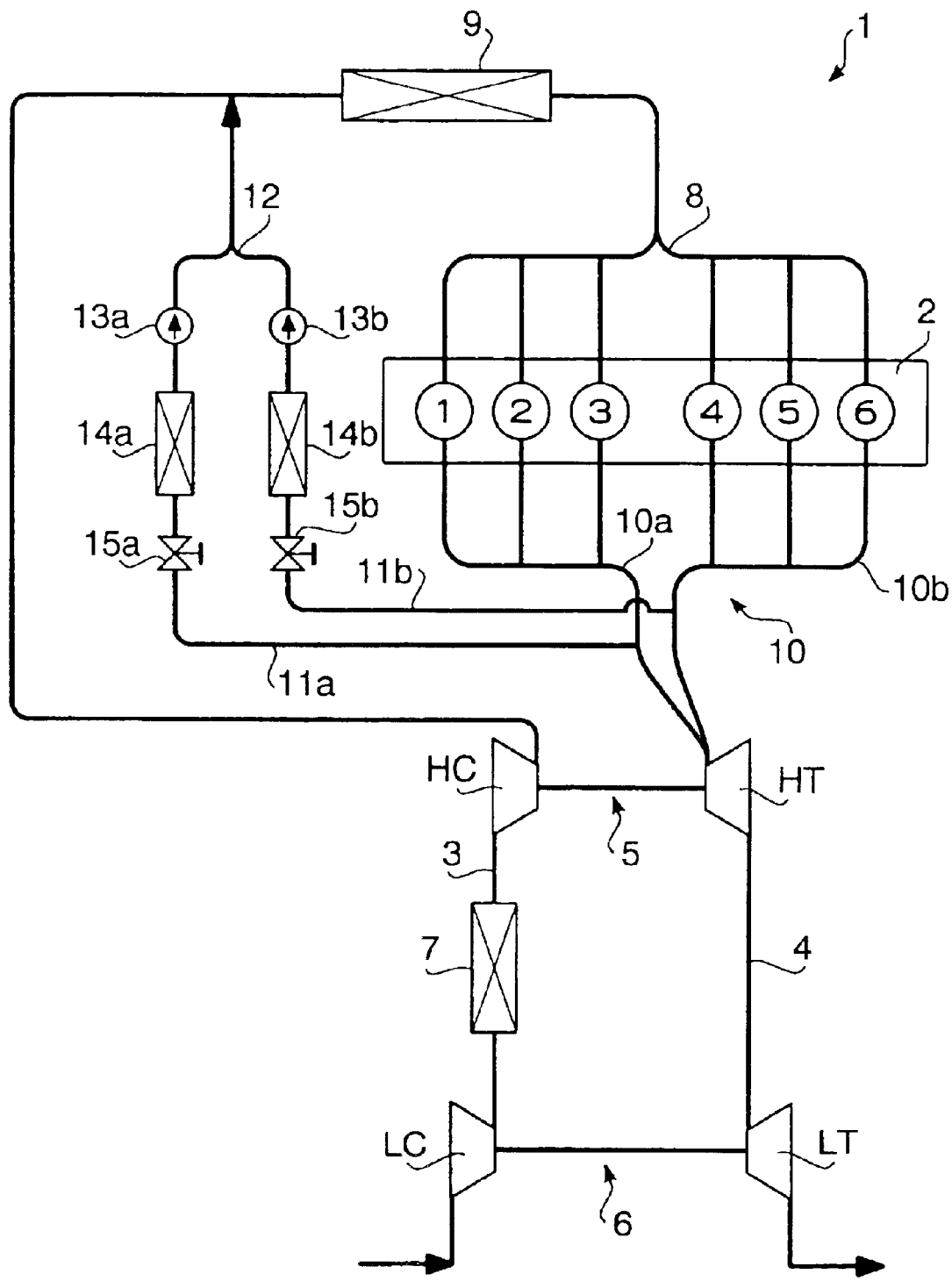
FIG. 1 is a schematic diagram of the turbo-charged engine with EGR according to one embodiment of this invention.

As shown in FIG. 1, an in-line six-cylinder diesel engine 2 is used for a turbo-charged engine 1 with EGR relating to this embodiment. The engine 2 has two turbochargers 5 and 6 (simply referred as "turbo" henceforth) arranged in series in an intake passage 3 and an exhaust passage 4 of the engine 2. That is, a high stage turbine HT and a low stage turbine LT are arranged in the exhaust passage 4 of the in-line six-cylinder diesel engine 2 at an interval in a direction of exhaust gas flow. A high stage compressor HC and a low stage compressor LC are arranged in series in the intake passage 3 of the engine 2 at an interval in a direction of intake air flow.

The high stage compressor HC and the high stage turbine HT are coupled by a rotation shaft to form the high stage turbo 5, and the low stage compressor LC and the low stage turbine LT are coupled by a rotation shaft to form the low stage turbo 6. A low-pressure stage charge cooler 7 is interposed in the intake passage 3 between the low stage compressor LC and the high stage compressor HC, and a high-pressure stage charge cooler 9 is interposed in the intake passage 3 between the high stage compressor HC and an intake manifold 8 of the engine 2.

An exhaust manifold 10 of the engine 2 is divided into a first exhaust manifold 10a gathering Nos.1 to 3 cylinders and a second exhaust manifold 10b gathering Nos.4 to 6 cylinders. An intake manifold 8 is not divided, gathering Nos. 1 to 6 cylinders. Combustion order of each cylinder in the in-line six-cylinder engine 2 is generally an order of No. 1, No. 5, No. 3, No. 6, No. 2 and No. 4. Therefore, in one group of cylinders connected to the first exhaust manifold 10a and another group of cylinders connected to the second exhaust manifold 10b respectively, one cylinder is not successively in combustion stroke after another cylinder is in combustion stroke, even in the case that the one cylinder adjoins the another cylinder.

A first EGR passage 11a connects the first exhaust manifold 10a to the intake passage 3 being between the high-pressure stage charge cooler 9 and the high stage compressor HC. Similarly, a second EGR passage 11b connects the second exhaust manifold 10b to the intake passage 3 being between the high-pressure stage charge cooler 9 and the high stage compressor HC. Thereby, exhaust interference in a gathering part 12 of the 1st EGR passage 11a and the 2nd EGR passage 11b is avoidable, and when one cylinder involved in the exhaust manifold 10a or 10b to which the EGR passage 11a or 11b is connected is in exhaust stroke, another cylinder involved in the intake manifold 8 to which the EGR passage 11a and 11b is connected is in intake stroke.

Optionally, an exit part or the gathering part 12 of the 1st EGR passage 11a and the 2nd EGR passage 11b may be connected to the intake manifold 8.

Check valves 13a and 13b are respectively interposed in the 1st and 2nd EGR passages 11a and 11b to allow the flow only in a direction from the exhaust manifold 10a, 10b to the intake passage 3, and to prevent it from flowing in an opposite direction. For example, a reed valve is used as the check valve 13a and 13b. EGR gas coolers 14a and 14b are interposed in the 1st and 2nd EGR passages 11a and 11b respectively for cooling the EGR gas which flows in the passages. EGR valves 15a and 15b are interposed in the 1st and 2nd EGR passages 11a and 11b respectively for continuously or gradually adjusting flow rate of the EGR gas which flows in the passage from 0% to 100%.

Capacities of the high stage turbine HT and the low stage turbine LT are set such that in a high speed and high load region of an operating state of the engine 2, if the exhaust gas is supplied to the high stage turbine HT with the EGR valves 15a and 15b closed, at least one of the high stage turbine HT and the low stage turbine LT overruns beyond a maximum speed limit, and if the EGR valve 15a or 15b is opened to return some of the exhaust gas to an intake side to decrease an amount of gas supplied to the high stage turbine HT, both of the high stage turbine HT and the low stage turbine LT rotate at less speed than the maximum speed limit.

That is, if the EGR valves 15a and 15b are opened, flow rate of the exhaust gas supplied to the high stage turbine HT decreases. Therefore, capacities of the high stage turbine HT and the low stage turbine LT are set to be less according to the decreased flow rate, compared with the case where capacities of them are set to match up with the state that the EGR valves 15a and 15b are closed. That is, in this embodiment, the capacities of the high stage turbine HT and the low stage turbine LT are set to be less amount to match up with the state where the EGR valve 15a or 15b is opened (or state where flow rate of the exhaust gas supplied to the high stage turbine HT is reduced).

Figure 2:
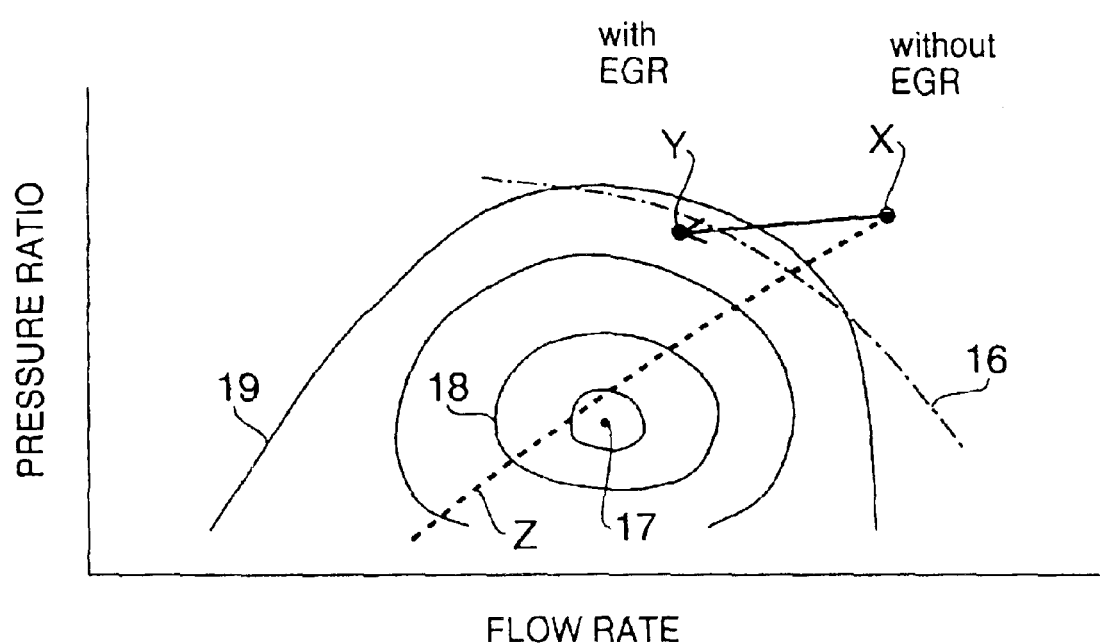
FIG. 2 is a graph showing a performance characteristic of the compressor.

As is generally known, if capacities of turbines HT and LT are made less, turbos 5 and 6 become easy to rotate. Therefore, in the case that equal flow rate of the exhaust gas to that in the case where the capacity is not made less is supplied to the turbines HT and LT, as shown in FIG. 2, if pressure ratio increases with increase of flow rate along an engine operation line Z, the pressure ratio reaches a point X which is beyond a maximum speed limit line 16. This will probably result in damage of the turbos 5 and 6 due to its overrun. In this embodiment, therefore, capacities of the high stage turbine HT and the low stage turbine LT are set to be less amount such that in the high speed and high load region of the engine operating state, if the exhaust gas is supplied to the high stage turbine HT with the EGR valve 15a and 15b closed, at least one of the high stage turbine HT and the low stage turbine LT overruns beyond the maximum speed limit line 16 (point X), and if the EGR valve 15a, 15b is opened to return some of the exhaust gas to an intake side, both of the turbines HT, LT operate within the maximum speed limit line 16 (point Y).

Assuming that outer diameters of the turbines HT and LT are regarded as 100% which are set to match up with the case where the exhaust gas is supplied to the high stage turbine HT with the EGR valves 15a and 15b closed in the high speed and high load region of the engine operating state, in this embodiment, for example, the outer diameters of the turbines HT and LT are regarded as about 84%, thereby the capacity=flow rate=0.84×0.84≈70%, and revolution speed=1/0.84≈119%. Similarly, outer diameters of the compressors HC and LC are regarded as about 95%, thereby capacity=flow rate=0.95×0.95≈90%, and revolution speed=1/0.95≈105%. Reason for making the size of the compressors HC and LC smaller is to match up with driving force given by the turbine HT and LT. That is, in this embodiment, capacities of the turbos 5 and 6 are set to be less.

In FIG. 2, reference 17 shows a maximum efficiency point of the compressor, a multiplex circle 18 shows iso efficiency curve, reference 19 shows a surge limit line, reference 16 shows a maximum revolution speed limit line, and reference Z shows an operation line. If the turbo is operated exceeding the maximum revolution speed limit line 16, it is highly probable that the turbo is broken. Therefore, it is required to control the flow rate so as not to exceed the maximum revolution speed limit line 16. In this embodiment, the point X which exceeds the limit line 16 if EGR is not performed is shifted to the point Y within the limit line 16 by performing EGR.

Opening degrees of the EGR valves 15a and 15b are controlled by the control device not illustrated. The control device opens the EGR valves 15a and 15b in a region (crossing region) in which the turbo 5 or 6 exceeds maximum speed limit (limit line 16 shown in FIG. 2), according to a map or formula predetermined by experiment, simulation, etc. Thereby, it is avoided beforehand that the turbo 5 or 6 is operated in an overrun region (point X) outside the limit line 16. The turbo 5 or 6 is always operated in a region (point Y) within the limit line 16.

An operation of this embodiment which consists of the above compositions is described hereinbelow.

As shown in FIG. 1, with regard to the exhaust gas discharged from the engine 2, some of the gas from the exhaust manifold 10a, 10b goes through the EGR passage 11a, 11b to be led to the intake passage 3, then being cooled by the charge cooler 9 before supplied to the engine 2. Another gas is led to the high stage turbine HT to drive the high stage turbo 5, afterwards being led to the low stage turbine LT to drive the low stage turbo 6. That is, a part of the exhaust gas discharged from the engine 2 recirculates via the EGR passages 11a, 11b, and the remainder drives two turbos 5 and 6.

In particular, in this embodiment, the capacities of the high stage turbine HT and the low stage turbine LT are set on a premise that EGR is performed to reduce flow rate of the exhaust gas supplied to the turbine HT in the high speed and high load region of the engine operating state (i.e., the capacities of the turbines HT, LT are set such that in the high speed and high load region of the engine operating state, if all of the exhaust gas is supplied to the high stage turbine HT with the EGR valve 15a and 15b closed, at least one of the high stage turbine HT and the low stage turbine LT overruns beyond the maximum speed limit line 16, and if the EGR valve 15a, 15b is opened to return some of the exhaust gas to the intake passage 3 to reduce flow rate of the exhaust gas supplied to the turbine HT, both of the turbines HT, LT operate within the maximum speed limit line 16). Accordingly, even if EGR is performed in the high speed and high load region of the engine operating state, the turbos 5 and 6 of each stages are driven to rotate in a high efficient region, and the power output and the fuel consumption improve.

Described in detail, conventionally, the capacities of the turbos of each stage are set on a premise that EGR is not performed in a high load region of the engine operating state (at least). Therefore, if some of the exhaust gas is fed back to the intake passage side to reduce the flow rate of the exhaust gas supplied to the turbines HT and LT, the capacities of the turbos (or turbines) of each stages do not match with the flow rate supplied to the turbines (i.e., capacities of the turbines of each stages are too much relative to the flow rate of the exhaust gas supplied). This will cause reducing revolution speed of the turbos. Accordingly, intake pressure becomes insufficient and power output declines. Furthermore, turbo efficiency becomes lower and fuel consumption also gets worse since the turbos operate in a region not matching up with the capacity of turbines HT, LT. In addition, generally, EGR is prohibited with the EGR valves closed in the high load region where high power output is necessary, since the amount of air is insufficient to the amount of injection fuel and smoke tends to generate in the high load region.

On the contrary, according to this embodiment, the flow rate of the exhaust gas matches up with the capacities of the turbos 5 and 6 (capacities of the turbines HT and LT) by performing EGR in the high revolution speed and high load region of the engine operating state, since the capacities of the high stage turbine HT and the low stage turbine LT are set on the premise that EGR is performed to reduce the flow rate of the exhaust gas supplied in the high speed and high load region of the engine operating state. Therefore, the turbos 5 and 6 of each stages are driven to rotate in a high efficient region, and it is possible to secure desirable revolution speed and intake pressure and to improve power output and fuel consumption. That is, conventionally, it has been commonly envisaged that by performing EGR, both of fuel consumption and power output deteriorate due to reduction of the amount of intake air and various operations for compensating that reduction. However, according to this embodiment, both of fuel consumption and power output improve, and EGR can be performed in the high speed and high load region of the engine operating state where EGR has not been performed conventionally.

Figure 3:
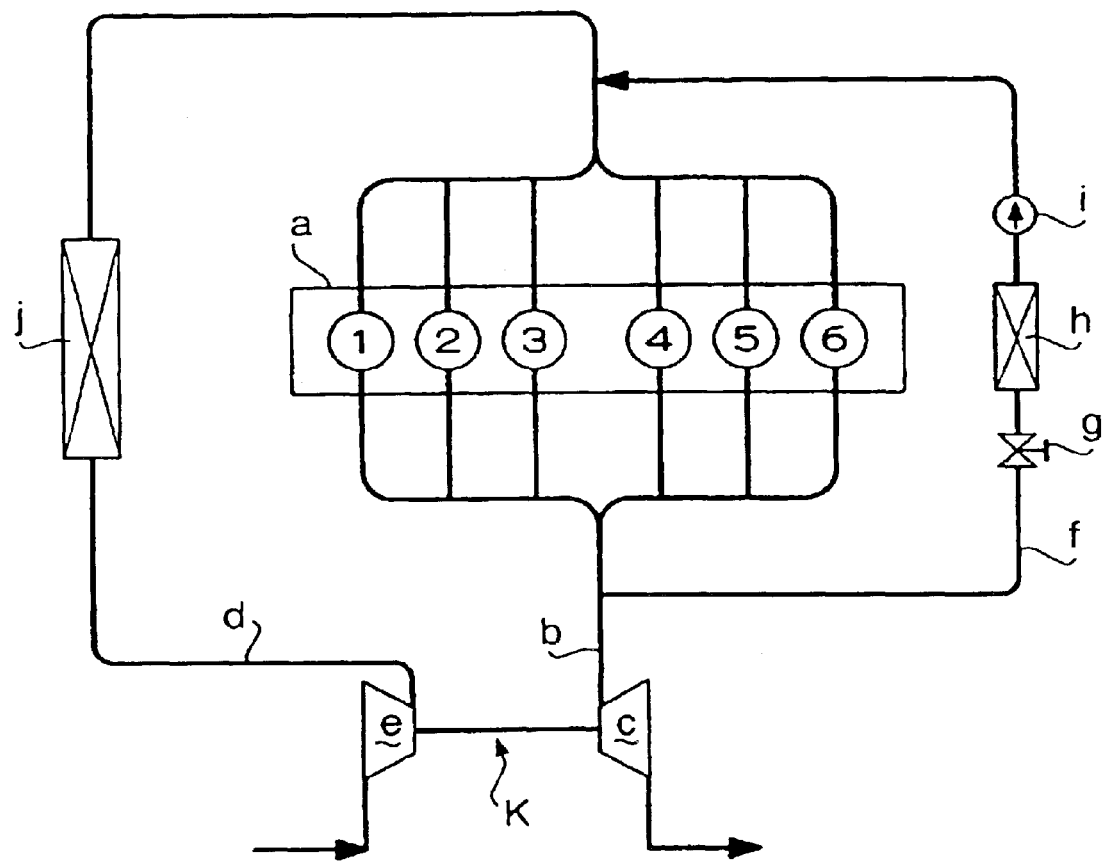
FIG. 3 is a schematic diagram of the conventional turbo-charged engine with EGR.

In the two-stage supercharge system in which turbos 5 and 6 are arranged in series like the embodiment illustrated, since supercharging pressure can be raised rather than that in the one-stage supercharge system of FIG. 3, sufficient amount of air to the amount of injection fuel can be supplied to the engine 2 not only in the low and middle load region but also in the high load region. Therefore, even if EGR is performed in the high load region and then the amount of intake air becomes less by the amount of EGR gas, the amount of intake air does not become insufficient. Therefore, problems such as power output falling, smoke generating and aggravation of fuel consumption do not arise notably. Since the EGR gas is cooled in two steps by the EGR coolers 14a and 14b and the charge cooler 9, volume of the EGR gas becomes less that leads to avoiding shortage of the amount of intake air caused by EGR.

As shown in FIG. 1, the exhaust gas is taken out of the upstream side of the high stage turbine HT, thereby energy of the exhaust gas for driving the turbines HT and LT decreases by corresponding amount to the exhaust gas taken out. However, since the exhaust gas taken out is returned to the downstream side of the high stage compressor HC in the EGR process, the amount of intake air that the compressors HC and LC must pressurize does not increase. Therefore, in this point of view, the revolution speed of the turbos 5 and 6 of each stages does not fall extremely compared with the case where EGR is not performed.

Since the EGR gas (exhaust gas) led to the intake passage 3 through the EGR passages 11a and 11b is led to the upstream side of the charge cooler 9, the EGR gas is cooled by the EGR coolers 14a and 14b and then by the charge cooler 9 before supplied to the engine 2. Therefore, it can be restrained that the intake air temperature rises, i.e., the power output of the engine 2 falls, under the heat influence by the EGR gas. Since the EGR gas is led to the downstream side of the high stage compressor HC, an impeller made of a material such as aluminum or resin is not influenced by the heat.

Since the check valves 13a and 13b are respectively interposed in the EGR passages 11a and 11b, adverse current of the intake air from the intake passage 3 side to the exhaust manifold 10 side can be securely prevented. If a reed valve etc. is used for the check valves 13a and 13b, the check valves 13a and 13b can open and close appropriately at quite short cycles in response to exhaust pulsation and intake pulsation. Even if average exhaust gas pressure and average intake pressure are nearly equal to each other, the check valves 13a and 13b can open immediately when instantaneous exhaust gas pressure exceeds instantaneous intake air pressure in intake and exhaust pulsation process. This realizes appropriate EGR to be performed.

In this embodiment, the exhaust manifold 10 of the in-line, six-cylinder engine 2 is divided into the first exhaust manifold 10a gathering Nos.1–3 cylinders and the second exhaust manifold 10b gathering Nos.4–6 cylinders, and the EGR passages 11a, 11b are respectively connected to the first and second exhaust manifold 10a, 10b, and the check valves 13a, 13b are respectively provided in each of the EGR passages 11a, 11b. Accordingly, pressure in intake stroke can be higher than average pressure, and pressure in exhaust stroke can be lower than average pressure.

That is, in the case of the in-line six-cylinder engine 2, when No. 1 cylinder is in intake stroke, No. 3 cylinder is in exhaust stroke. When the No. 3 cylinder starts to exhaust, exhaust gas pressure momentarily becomes high which opens the check valve 13a (reed valve) to make the EGR gas to flow. No. 1 cylinder is in intake stroke at this time, which means that intake pressure into No. 1 cylinder increases by introduction of the EGR gas with high pressure from No. 3 cylinder. On the other hand, seeing from No. 3 cylinder, exhaust gas pressure of the No. 3 cylinder decreases as the No. 1 cylinder positively sucks the exhaust gas from the No. 3 cylinder. The same things happen in all cylinders. For this reason, pumping loss decreases, and pumping gain increases which is advantageous for fuel consumption.

As described above, according to the turbo-charged engine with EGR relating to this invention, EGR can be performed in the high speed and high load region of the engine operating state without reducing power output and worsening fuel consumption.

While the invention had been described with reference to the preferred embodiments, it will be understood by those skilled in the art that various obvious changes may be made, and equivalents may be substituted for elements thereof, without departing from the essential scope of the present invention. Therefore, it is intended that the invention not be limited to the particular embodiments disclosed, but that the invention includes all embodiments falling within the scope of the appended claims.

What is claimed is:

1. A turbo-charged engine with EGR comprising a turbocharger having a turbine and a compressor, an EGR passage connecting an exhaust passage upstream of the turbine of the turbocharger and an intake passage downstream of the compressor to each other for returning some of exhaust gas in the exhaust passage to the intake passage, and an EGR valve provided in the EGR passage for adjusting a passage area of the EGR passage, wherein capacity of the turbine is set such that in a high speed and high load region of the engine operating state, if the exhaust gas is supplied to the turbine with the EGR valve closed, the turbocharger overruns beyond a maximum speed limit, and if the EGR valve is opened to return some of the exhaust gas to an intake passage side, the turbocharger rotates at lower speed than the maximum speed limit.

2. The turbo-charged engine with EGR as defined in claim 1, further comprising a control device for opening the EGR valve in a region that the turbocharger overruns beyond the maximum speed limit.

3. The turbo-charged engine with EGR as defined in claim 1, wherein the turbocharger has a high stage turbine and a low stage turbine provided in series in the exhaust passage of the engine, and a high stage compressor and a low stage compressor provided in series in the intake passage of the engine and respectively driven by each of the turbines, and the EGR passage connects the exhaust passage upstream of the high stage turbine and the intake passage downstream of the high stage compressor to each other.

4. The turbo-charged engine with EGR as defined in claim 3, wherein capacities of the high stage turbine and the low stage turbine are respectively set such that in the high speed and high load region of the engine operating state, if the exhaust gas is supplied to the high stage turbine with the EGR passage closed, at least one of the high stage turbine and the low stage turbine overruns beyond the maximum speed limit, and if the EGR passage is opened to return some of the exhaust gas to the intake side, both of the turbines rotate lower speed than the maximum speed limit.

5. The turbo-charged engine with EGR as defined in claim 1, further comprising a charge cooler for cooling intake air, which is provided in the intake passage and located at downstream side of a position to which the EGR passage is connected.

6. The turbo-charged engine with EGR as defined in claim 1, wherein an EGR cooler for cooling EGR gas is provided in the EGR passage.

7. The turbo-charged engine with EGR as defined in claim 6, wherein the EGR cooler is provided in the EGR passage downstream side of the EGR valve.

8. The turbo-charged engine with EGR as defined in claim 1, wherein a check valve is provided in the EGR passage to allow a flow only in a direction from the exhaust passage to the intake passage and to prevent the flow in an opposite direction thereof.

9. The turbo-charged engine with EGR as defined in claim 8, wherein the check valve is provided in the EGR passage downstream side of the EGR valve.

10. The turbo-charged engine with EGR as defined in claim 1, wherein an EGR cooler for cooling EGR gas is provided in the EGR passage, and a check valve is provided in the EGR passage downstream of the EGR cooler to allow a flow only in a direction from the exhaust passage to the intake passage and to prevent the flow in an opposite direction thereof.

11. The turbo-charged engine with EGR as defined in claim 1, wherein the engine is a multi-cylinder engine and has an exhaust manifold and an intake manifold at least one of which is divided into two or more, wherein each part of the divided exhaust manifold or intake manifold is individually connected to the divided or not divided intake manifold or exhaust manifold by two or more of the EGR passages such that when one cylinder involved in the exhaust manifold to which a certain EGR passage is connected is in exhaust stroke, another cylinder involved in the intake manifold to which the certain EGR passage is connected is in intake stroke.

12. The turbo-charged engine with EGR as defined in claim 1, wherein the engine is a multi-cylinder engine and has an exhaust manifold divided into two or more, wherein each part of the divided exhaust manifold is individually connected to the intake passage by two or more of the EGR passages.

13. The turbo-charged engine with EGR as defined in claim 1, wherein the engine is a six-cylinder engine and has an exhaust manifold, combustion order of each cylinders is No. 1, No. 5, No. 3, No. 6, No. 2 and No. 4, the exhaust manifold is divided into a first exhaust manifold gathering No. 1–3 cylinders and a second exhaust manifold gathering No. 4–6 cylinders, and the EGR passage comprises a first EGR passage connecting the first exhaust manifold and the intake passage to each other and a second EGR passage connecting the second exhaust manifold and the intake passage to each other.

14. The turbo-charged engine with EGR as defined in claim 13, wherein the first EGR passage and the second EGR is gathered to connect to the intake passage.

15. The turbo-charged engine with EGR as defined in claim 13, wherein the EGR valve, an EGR cooler and a check valve are provided in series in each of the first EGR passage and the second EGR passage.

* * * * *